UNITED STATES PATENT OFFICE.

JAMES A. TRIMBLE, OF BROOKLYN, NEW YORK.

HYDROGEN-PEROXID SOLUTION.

1,128,637. Specification of Letters Patent. Patented Feb. 16, 1915.

No Drawing. Application filed September 4, 1914. Serial No. 860,142.

*To all whom it may concern:*

Be it known that I, JAMES A. TRIMBLE, a citizen of the United States, residing at Brooklyn, Kings county, State of New York, have invented certain new and useful Improvements in Hydrogen-Peroxid Solution, of which the following is a full, clear, and exact description.

This invention relates to hydrogen peroxid preparations, and aims to provide a compound of greatly increased stability without the disadvantages resulting from the present methods and substances used to stabilize such a solution.

Hydrogen peroxid, as is well known, has a comparatively low degree of stability even when mineral acid is added together with such various other stabilizing agents such as acetanilid, alcohol, borax acid, benzoic acid, salicylic acid, salol, etc., etc., all of which agents are objectionable either commercially, medicinally or both.

The most generally used stabilizing agent other than the mineral acids, is acetanilid. This substance, however, has many disadvantages. Medicinally it is known to have heart depressing properties and to have an injurious effect on the human system. It is regarded as an injurious substance by the Government authorities, and its presence required to be stated upon labels for the peroxid preparation, thereby detracting to some extent from its commercial value. In the course of time it may decompose and often develops a foreign odor and slight color.

The stabilizing agent which I employ is cinchonidin. I find that the cinchonidin, its derivatives or isomer, cinchonin, when added to an aqueous solution of hydrogen peroxide prepared in any suitable manner, renders the same very stable and does not have the disadvantages resulting from the use of acetanilid.

One proportion in which the cinchonidin is advantageously used is in a three per cent. (3%) aqueous solution of hydrogen peroxid, one part of cinchonidin to twenty thousand (20,000) parts of aqueous solution. A six months' test of a three per cent. (3%) aqueous solution of hydrogen peroxid having cinchonidin added thereto in the proportion above given, has shown that the solution so treated loses less than one-fifth the quantity of hydrogen peroxid that the same solution will lose in the same time when stabilized with acetanilid in the proportion of one part to twenty-seven hundred (2700) parts of hydrogen peroxid solution. The use of cinchonidin, its derivatives, or its isomer, even in very minute quantities, therefore, greatly increases the stability of aqueous solutions of hydrogen peroxid.

The proportions above given are desirable, but I do not limit myself thereto as my stabilizing agent is effective for aqueous solutions of hydrogen peroxid of any other concentration, and the use of my stabilizing agent is not limited either to the degree of concentration set forth or to any specific proportion of cinchonidin, as the same results may be obtained with other proportions and other concentrations.

In the claims it will be understood that the term "cinchonidin" is used to include its derivatives and isomer as equivalents of cinchonidin.

What I claim therefore and desire to secure by Letters Patent is,—

1. A solution of hydrogen peroxid containing cinchonidin.

2. An aqueous solution of hydrogen peroxid containing cinchonidin in relatively minute proportion.

3. A three per cent. (3%) aqueous solution of hydrogen peroxid containing cinchonidin in substantially the proportion of one part of cinchonidin to approximately twenty thousand (20,000) parts of hydrogen peroxid solution.

JAMES A. TRIMBLE.

Witnesses:
JAS. CUTSAN,
R. A. BARTON.